United States Patent [19]

Hayatsu et al.

[11] Patent Number: 4,623,638

[45] Date of Patent: Nov. 18, 1986

[54] SILICA GEL LINKED TO A PHTHALOCYANINE COMPOUND AND A METHOD FOR TREATING POLYCYCLIC ORGANIC SUBSTANCES THEREWITH

[75] Inventors: Hikoya Hayatsu, Okayama; Masahide Nakano, Hirakata; Yoshikazu Matsuo, Sakai, all of Japan

[73] Assignee: Sumitomo Chemical Company, Limited, Osaka, Japan

[21] Appl. No.: 714,675

[22] Filed: Mar. 21, 1985

[30] Foreign Application Priority Data

Mar. 27, 1984 [JP] Japan ................................ 59-60262

[51] Int. Cl.$^4$ .............................................. B01D 15/00
[52] U.S. Cl. .................................... 502/401; 502/163; 210/679
[58] Field of Search ................................ 502/163, 401

[56] References Cited

U.S. PATENT DOCUMENTS

| | | | |
|---|---|---|---|
| 3,692,842 | 9/1972 | Massie | 502/163 X |
| 3,816,548 | 6/1974 | Williams et al. | 502/163 X |
| 3,984,349 | 10/1976 | Meiller et al. | 502/401 |
| 4,324,681 | 4/1982 | House | 502/401 X |
| 4,430,229 | 2/1984 | Yamawaki et al. | 502/401 X |
| 4,460,475 | 7/1984 | Hayatsu et al. | 210/674 |
| 4,490,525 | 12/1984 | Hayatsu et al. | 536/54 |

FOREIGN PATENT DOCUMENTS

| | | | |
|---|---|---|---|
| 170506 | 7/1984 | Japan . | |
| 47001 | 12/1984 | Japan . | |
| 1121182 | 7/1968 | United Kingdom | 502/163 X |

OTHER PUBLICATIONS

Mutation Research, 119 (1983), pp. 233-238.

*Primary Examiner*—Patrick P. Garvin
*Attorney, Agent, or Firm*—Cushman, Darby & Cushman

[57] ABSTRACT

Silica gel is treated with a reactive phthalocyanine compound to form the blue silica gel, which has a phthalocyanine skeleton linked through an organic group. Typically, a phthalocyanine reactive dye is used for the reaction with silica gel at its hydroxyl or other reactive site. The blue silica gel easily adsorbs and desorbs the polycyclic organic substances in a solution. The blue silica gel can be used for the separation or removal of the mutagenic substances from the environment, foodstuffs, etc.

11 Claims, No Drawings

SILICA GEL LINKED TO A PHTHALOCYANINE COMPOUND AND A METHOD FOR TREATING POLYCYCLIC ORGANIC SUBSTANCES THEREWITH

The present invention relates to silica gel linked to a phthalocyanine compound, and to a method for treating polycyclic organic substances therewith.

More particularly, the present invention relates to silica gel which is linked chemically to a compound having a phthalocyanine skeleton, and to a method for selectively adsorbing and desorbing polycyclic organic substances, especially the mutagenic substances, contained in various solutions, by using the said silica gel as an adsorbent.

Recently, the mutagenic substances present in the environment, foodstuffs, etc., have come to be recognized as possible causes for human cancer. Accordingly, the issue of developing methods to analyze these substances in the environment, and to remove, if possible, therefrom, has become an urgent one.

As for the treatment that can be used for the elimination through selective adsorption, and the concentration through desorption, of these mutagenic substances, there have been known methods described in the Japanese Unexamined Published Patent Specifications Nos. 47,001/1983 and 170,506/1983 and European Patent Application No. 83301669. In these methods, an organic material having a chemically linked phthalocyanine skeleton was employed as an adsorbent.

The present inventors have found that silica gel which is linked chemically to a compound having a phthalocyanine skeleton is useful as a selective adsorbent for polycyclic organic substances, especially the mutagenic substances, and, in particular, useful as a column-filler for high-pressure liquid chromatography.

The present invention provides silica gel which is linked chemically to a compound having a phthalocyanine skeleton. It also provides a method for treating polycyclic organic substances with said silica gel to the effect that such polycyclic organic substances contained in various solutions are adsorbed, desorbed or separated.

The silica gel linked to a phthalocyanine compound is prepared by allowing the silica gel to react with a phthalocyanine compound having a group which is reactive to hydroxyl group present on the surface of the gel. Alternatively, the silica gel is treated first with an organic compound to convert the hydroxyl group present on the surface of the gel to another reactive group, and then, a phthalocyanine compound having a group that can react with such a reactive group is allowed to react with the silica gel.

The preparation of the silica gel linked to a phthalocyanine compound is practiced as follows; (a) silica gel is allowed to react with an aminoalkyl trialkoxysilane: the reaction takes place at the hydroxyl groups present on the surface of the gel; and the resulting amino derivative of silica gel is allowed to react with a phthalocyanine compound having a reactive halogen atom or a reactive double bond; or (b) silica gel is allowed to react with an aminoalkyl trialkoxysilane; the reaction takes place at the hydroxyl groups present on the surface of the gel; the resulting amino derivative is allowed to react with a dicarboxylic acid derivative to produce a monocarboxylic compound; the compound obtained is converted to an acid chloride; and then this functionalized gel is allowed to react with a phthalocyanine compound to form a covalent linkage at the functional-group site of the gel. The former method, (a), is preferable, since the materials required are easily available.

The silica gel having an aminoalkyl group has been well known. A method for preparing this material has been described in pages 80–81 of "Affinity chromatography: the Experiments and Applications", written by Ichiro Chibata, et al. (published from Kodansha, Tokyo, Sept. 10, 1976).

As the phthalocyanine compound having a reactive group, a reactive dye which is conventional in the dyestuff industry is advantageously employed.

The reaction between the silica gel having an aminoalkyl group with the reactive phthalocyanine compound is carried out on the basis of the process familiar in a dying process where a fiber material is dyed with a reactive dyestuff.

The phthalocyanine referred to in the present invention includes phthalocyanine derivatives containing a metal, such as copper, iron, nickel, cobalt, aluminum, etc. as the metal-ligand, as well as those containing no metal.

The phthalocyanine compounds advantageously employed in the present invention are reactive phthalocyanine dyestuffs which are well known in the dyestuff industry. For example, there are those dyestuffs having a phthalocyanine skeleton linked, through any one of various bivalent groups, with a reactive group, such as dihalotriazine, monohalotriazine, trihalopyrimidine, sulfatoethylsulfone, chloroethylsulfone, dihaloquinoxaline, dihalopyridazone, sulfatoethylsulfonamide, mono- or dihalopyrimidine, dihalophthalazine, acrylamide, vinylsufone, halobenzothiazole, methylolamine, etc.

The examples of such a reactive group are as follows:

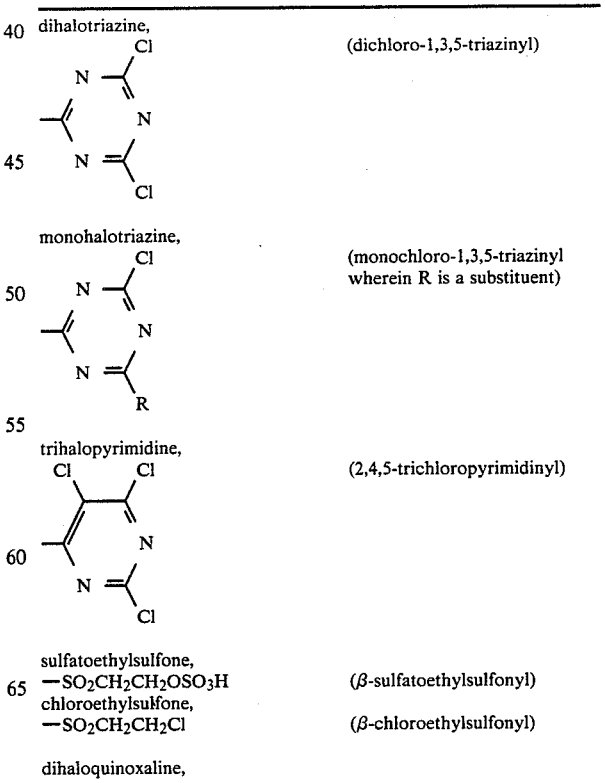

dihalotriazine, (dichloro-1,3,5-triazinyl)

monohalotriazine, (monochloro-1,3,5-triazinyl wherein R is a substituent)

trihalopyrimidine, (2,4,5-trichloropyrimidinyl)

sulfatoethylsulfone,
—$SO_2CH_2CH_2OSO_3H$  ($\beta$-sulfatoethylsulfonyl)
chloroethylsulfone,
—$SO_2CH_2CH_2Cl$  ($\beta$-chloroethylsulfonyl)

dihaloquinoxaline,

| Structure/Group | Name |
|---|---|
| −CO−(benzene ring fused to)−N=C(Cl)−C(Cl)=N− | (2,3-dichloroquinoxaline-6-carbonyl) |
| sulfatoethylsulfonamide, −SO$_2$NHC$_2$H$_4$OSO$_3$H | (β-sulfatoethylaminosulfonyl) |
| mono- or dihalopyrimidine, (Cl, CH$_3$ substituted pyrimidine with SO$_2$CH$_3$) | (2-methylsulfonyl-4-methyl-5-chloropyrimidinyl) |
| dichloropyrimidine (Cl, Cl substituted) | (2,4-dichloropyrimidinyl) |
| dihalophthalazine, −CO−(benzene ring)−C(Cl)=N−N=C(Cl)− | (1,4-dichlorophtahalazine-6-carbonyl) |
| dihalopyridazone, −COC$_2$H$_4$−N−N=C−C(Cl)=C(Cl)−C(=O) | (4,5-dichloro-6-pyridazonyl-propionyl) |
| acrylamide, −NHCOCH$_2$CH$_2$OSO$_3$H | (β-sulfatopropionylamido) |
| −NHCOCH$_2$CH$_2$Cl | (β-chloropropionylamido) |
| vinylsulfone, −SO$_2$CH=CH$_2$ | (vinylsulfonyl) |
| methylolamine, −NHCH$_2$OH | (methylolamino) |
| halobenzothiazole, (benzothiazole with Cl) | (chlorobenzothiazolyl) |

The reactive dyestuffs having these reactive groups have been described, for example, in Patent Nos. GB836647, GB805562, GB866513, GB948967, GB995796, GB1208553 and U.S. Pat. No. 3,268,548.

The polycyclic organic substances referred to in the present invention are aromatic or heterocyclic compounds having two or more fused-rings. As the embodied examples, the followings are illustrated: Trp-P-1 (3-amino-1,4-dimethyl-5H-pyrido-[4,3-b]indole), Trp-P-2 (3-amino-1-methyl-5H-pyrido[4,3-b]indole), Glu-P-1 (2-amino-6-methyldipyrido-[1,2-a:3′,2′-d]imidazole, Glu-P-2 (2-amino-dipyrido[1,2-a:3′,2′-d]imidazole), amino-α-carboline (2-amino-9H-pyrido[2,3-b]indole), aminomethyl-α-carboline (2-amino-3-methyl-9H-pyrido[2,3-b]indole), IQ (2-amino-3-methylimidazo[4,5-f] quinoline, 2-acetylaminofluorene, ethidium bromide, MeIQ$_x$ (2-amino-3,8-dimethylimidazo[4,5-f] quinoxaline), 9-aminoacridine, quinacrine, 8-methoxypsoralen, chloropromazine, norharman (β-carboline), etc.

These polycyclic organic substances can be effectively adsorbed to the silica gel having covalently linked phthalocyanine compounds (hereinafter referred to as "blue silica gel"). The adsorption is effected, for example, by adding the blue silica gel to a solution, especially an aqueous solution, containing the polycyclic organic substances, and by agitating, or shaking, the mixture at a temperature between 0° to 100° C., preferably in the range 15° to 30° C. Alternatively, the blue silica gel is filled in a column, and a solution containing the polycyclic substances is passed therethrough.

Desorption of the polycyclic organic substances from the blue silica gel is conducted in the following way. The blue silica gel which has adsorbed the polycyclic organic substances is mixed with a neutral, weakly alkaline or weakly acidic solvent, for example, methanol, a methanoltrifluoroacetic acid solution, a methanol-aqueous ammonia solution, etc., and the mixture is agitated or shaken at a temperature below the boiling point of the solvent employed. When a polycyclic organic substance which has been adsorbed to blue silica gel packed in a column, is to be desorbed, the column is eluted with such a desorbing solvent. The substances can be isolated by evaporation of the solvent.

Furthermore, separation and quantitative analysis of various polycyclic organic substances contained in a solution can be conducted by use of the blue silica gel filled in a column of highpressure liquid chromatography.

According to the method of the present invention, the polycyclic organic substances can be selectively adsorbed using the blue silica gel. Particularly, the method is effective to the substances having not-less-s-than-three-fused-rings. The method of the present invention is useful in qualitative and quantitative analysis, as well as removal, of mutagenic substances, particularly in the selective adsorption, desorption, concentration and separation, of polycyclic organic substances, such as those present in the environment, foodstuffs, tobacco, living body samples, etc. in extremely small quantities. For instance, the method of the present invention can be applied for quantitative measurement of the mutagenic substances in river water, removal of the mutagenic substances from beef extract, quantification of the mutagenic substances in urine, and removal of the mutagenic substances in tobacco smoke and exhaust gas.

The present invention will be described further in detail with reference to the following examples, which are, however, presented merely for the purpose of illustration, and not for the purpose of limitation.

EXAMPLE 1

Preparation of the blue silica gel

Into 120 ml of water placed in a 300 ml-beaker was added 30 g of Lichrosorb NH$_2$ (a reaction product of a silica gel and γ-aminopropyltriethoxysilane; manufactured by E. Merck A.G.), and the mixture was heated to 75° C. under a slow and constant agitation.

To the mixture were added 3 g of Sumifix Turquoise Blue G 150% (a reactive dye manufactured by Sumitomo Chemical Co., Ltd.: Color Index, Reactive Blue 21) and 8 g of anhydrous sodium sulfate, and the resulting mixture was agitated for 20 minutes. During the latter agitation, 2.4 g of sodium carbonate was further added to the mixture, which was kept at 75° C. for 45 minutes until the reaction was completed.

The reaction mixture was filtered using a suction funnel, and the solid was washed with water until the washing became colorless. The blue Lichrosorb NH₂ (the blue silica gel) obtained was dried. The copper content was quantified by atomic absorption analysis, giving a value of 0.14%.

separation of the tested compounds may be achieved by use of Column II.

The flow rate of the elution liquid was 1 ml/minute, in either column I or II. The elution liquid employed for Column I was an aqueous 50% methanol. The liquid for Column II was an aqueous 50% methanol during the first 5 minutes, 100% methanol during the next 5 minutes, and 100% acetonitrile thereafter. Each substance was detected by absorbance of UV-light.

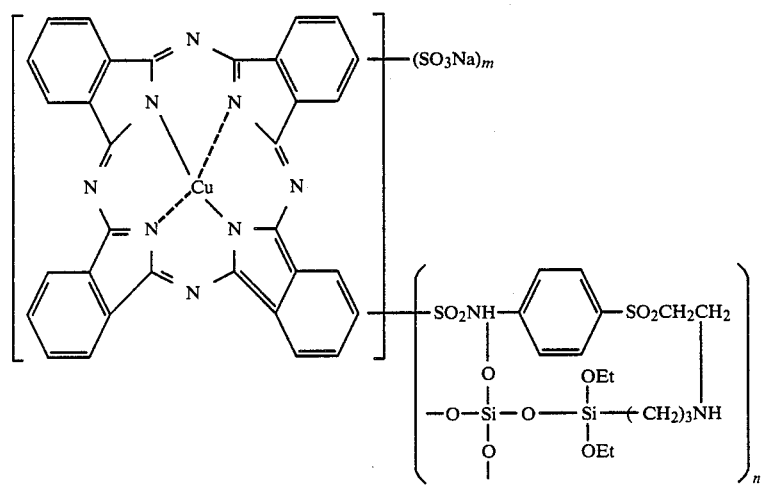

$(1 \leq n \leq 2, 1 \leq m \leq 3, 2 \leq m + n \leq 4)$

EXAMPLE 2

Separation of the polycyclic organic substances using the blue silica gel

A column (0.4 cm in diameter and 25 cm in length) for high-pressure liquid chromatography was filled with the untreated Lichrosorb NH₂ (Column I), and another column (same in size) was filled with the blue Lichrosorb NH₂ prepared as in Example 1 (Column II).

Eleven polycyclic organic compounds were individually chromatographed through these columns, and the results obtained are shown below.

| Organic compounds | | Retention time (minutes) | |
|---|---|---|---|
| Name | Type of structure (system) | Column I | Column II |
| Adenine | a two-ring | 3.0 | 3.5 |
| Tryptophan | a two-ring | 3.8 | 5.6 |
| AF-2 | two one-rings | 2.7 | 7.6 |
| Glu-P-2 | a three-ring | 2.7 | 9.8 |
| Glu P-1 | a three-ring | 2.7 | 11.4 |
| Chloropromazine | a three-ring | 1.5 | 11.7 |
| 8-Methoxypsoralen | a three-ring | 2.8 | 11.9 |
| Amino-α-carboline | a three-ring | 3.0 | 12.1 |
| 2-Aminofluorene | a three-ring | 3.0 | 12.2 |
| Aminomethyl-α-carboline | a three-ring | 3.0 | 14.4 |
| 2-Acetylaminofluorene | a three-ring | 3.0 | 15.0 |

In Column I filled with the untreated Lichrosorb NH₂, these substances were little adsorbed, and no separation of the compounds could be attainable. On the other hand, in Column II filled with the blue silica gel, the adsorption becomes stronger as the number of rings present in the substances increases. This means that The silica gel treated with any of the reactive dyes as shown below, in place of the reactive dyes used in Example 1, gives comparable effectiveness.

Sumifix Turquoise Blue H-GF (a reactive dye manufactured by Sumitomo Chemical Co., Ltd.: Color Index Reactive Blue 15)

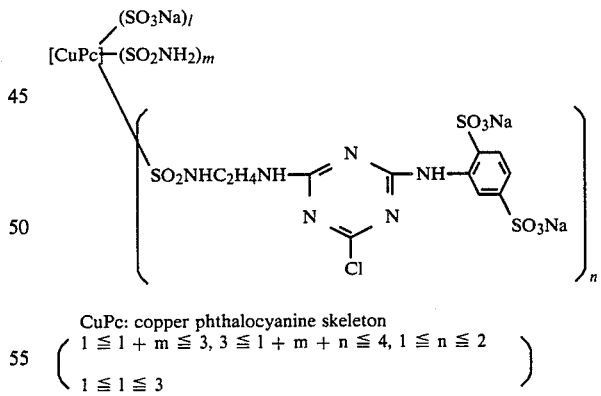

CuPc: copper phthalocyanine skeleton
$(1 \leq l + m \leq 3, 3 \leq l + m + n \leq 4, 1 \leq n \leq 2$
$1 \leq l \leq 3)$ Sumifix Turquois Blue GS (a reactive dye manufactured by Sumitomo Chemical Co., Ltd.: Color Index Reactive Blue 118)

Sumifix Turquoise Blue BF (a reactive dye manufactured by Sumitomo Chemical Co., Ltd.: Color Index Reactive Blue 148)

Color Index Reactive Blue 75 (Cibacron Pront Turquoise G: a reactive dye manufactured by Ciba-Geigy)

Color Index Reactive Blue 116 (Levafix Turquoise Blue E-BA: a reactive dye manufactured by Bayer A.G.)

Color Index Reactive Blue 105 (Drimarene Turquoise R-BLD: a reactive dye manufactured by Sandoz A.G.)

Color Index Reactive Blue 18 (Cibacron Turquoise Blue TG-E: a reactive dye manufactured by Ciba-Geigy)

Color Index Reactive Blue 41 (Cibacron Turquoise Blue 2G-E: a reactive dye manufactured by Ciba-Geigy)

Color Index Reactive Blue 71 (Procion Turquoise H-A: a reactive dye manufactured by Imperial Chemical Industries, Ltd.)

Color Index Reactive Blue 25 (Procion Turquoise H-5G: a reactive dye manufactured by Imperial Chemical Industries, Ltd.)

Color Index Reactive Blue 80 (Levafix Turquoise Blue E-4G: a reactive dye manufactured by Bayer A.G.)

Color Index Reactive Blue 3 ( Procion Turquoise H-7G: a reactive dye manufactured by Imperial Chemical Industries, Ltd.)

Color Index Reactive Blue 72 (Cibacron Turquoise Blue GR-D: a reactive dye manufactured by Ciba-Geigy)

Color Index Reactive Blue 140 (Procion Turquoise MXG: a reactive dye manufactured by Imperial Chemical Industries, Ltd.)

We claim:

1. Silica gel in which an organic group having phthalocyanine skeleton is chemically linked to a functional group reacted with the hydroxyl groups existing on the surface of the silica gel.

2. Silica gel according to claim 1 wherein the phthalocyanine is a metal containing one.

3. Silica gel according to claim 2 wherein the metal is copper.

4. Silica gel according to claim 1 wherein compound having a phthalocyanine skeleton is a reactive phthalocyanine dyestuff.

5. Silica gel according to claim 2 where the metal is copper, iron, nickel, cobalt, or aluminum.

6. A method for preparing silica gel linked covalently to a compound having a phthalocyanine skeleton, which comprises reacting the gel whose hydroxyl groups has been converted to a reactive residue with the compound having a phthalocyanine skeleton, or, reacting the hydroxyl groups of the gel with reactive groups of a phthalocyanine derivatives.

7. A method according to claim 6 wherein silica gel is allowed to react with aminoalkyl trialkoxysilane until the hydroxyl group present on the surface of the silica gel is converted to an aminoalkyl group and then the product obtained having the aminoalkyl group is allowed to react with a phthalocyanine compound having a reactive halogen atom or a double bond.

8. A method according to claim 6 wherein the reactive group of the compound having phthalocyanine skeleton is a dihalotriazinyl, monohalotriazinyl, trihalopyrimidinyl, sulfatoethylsulfonyl, chloroethylsulfonyl, dihaloquinoxaline-carbonyl, sulfatoethylaminosulfonyl, mono- or di-halopyrimidinyl, dihalophthalazinyl, dihalopyridazonyl, $\beta$-sulfatopropionylamino, $\beta$-chloropropionylamino, vinylsulfonyl, methylolamino, or halobenzothiazolyl group.

9. Silica gel prepared by the process of claim 6.

10. Silica gel prepared by the process of claim 7.

11. Silica gel prepared by the process of claim 8.

* * * * *